United States Patent
Zhu et al.

(10) Patent No.: US 11,790,419 B2
(45) Date of Patent: Oct. 17, 2023

(54) METHOD AND APPARATUS FOR GROUP PURCHASING USING A HISTORICAL PRICE IN AN E-COMMERCE ENVIRONMENT

(71) Applicant: Affirm, Inc., San Francisco, CA (US)

(72) Inventors: Qi Zhu, Toronto (CA); James Cunningham, Toronto (CA)

(73) Assignee: AFFIRM INC., San Francisco, CA (US)

( * ) Notice: Subject to any disclaimer, the term of this patent is extended or adjusted under 35 U.S.C. 154(b) by 45 days.

(21) Appl. No.: 17/057,184

(22) PCT Filed: May 22, 2019

(86) PCT No.: PCT/CA2019/050692
§ 371 (c)(1),
(2) Date: Nov. 20, 2020

(87) PCT Pub. No.: WO2019/222841
PCT Pub. Date: Nov. 28, 2019

(65) Prior Publication Data
US 2021/0209662 A1      Jul. 8, 2021

Related U.S. Application Data

(60) Provisional application No. 62/674,792, filed on May 22, 2018.

(51) Int. Cl.
*G06Q 30/00* (2023.01)
*G06Q 30/0601* (2023.01)
(Continued)

(52) U.S. Cl.
CPC ..... *G06Q 30/0605* (2013.01); *G06Q 30/0201* (2013.01); *G06Q 30/0223* (2013.01); *G06Q 30/0276* (2013.01); *G06Q 30/0635* (2013.01)

(58) Field of Classification Search
CPC ........... G06Q 30/0605; G06Q 30/0201; G06Q 30/0223; G06Q 30/0276; G06Q 30/0635; G06Q 30/0242
See application file for complete search history.

(56) References Cited

U.S. PATENT DOCUMENTS 6,249,772 B1 *  6/2001  Walker ................... G06Q 30/02
                                                        705/27.1
2008/0235076 A1 *  9/2008  Cereghini .......... G06Q 30/0202
                                                        705/7.35

(Continued)

FOREIGN PATENT DOCUMENTS

AU        2013100155 A4 *  3/2013

OTHER PUBLICATIONS

Fu-Ren Lin and Kuang-Yi Chang, "A multiagent framework for automated online bargaining," in IEEE Intelligent Systems, vol. 16, No. 4, pp. 41-47, Jul.-Aug. 2001, doi: 10.1109/5254.941356. (Year: 2001).*

(Continued)

*Primary Examiner* — Sun M Li
(74) *Attorney, Agent, or Firm* — Burr & Forman LLP

(57) ABSTRACT

The method and system are directed at providing group purchasing at a historical price in an e-commerce environment. A user may select a price that a price at which a produce previous sold, seen as the historical price. This price may then be used to generate an online purchasing campaign that other user may join. The purchasing campaign is user or consumer driver rather than merchant driven.

16 Claims, 5 Drawing Sheets

(51) Int. Cl.
  *G06Q 30/0201* (2023.01)
  *G06Q 30/0207* (2023.01)
  *G06Q 30/0241* (2023.01)

(56) References Cited

U.S. PATENT DOCUMENTS

| | | | | |
|---|---|---|---|---|
| 2008/0270221 | A1* | 10/2008 | Clemens | G06Q 10/06375 |
| | | | | 705/7.33 |
| 2010/0179868 | A1* | 7/2010 | del Rosario | G06Q 30/0214 |
| | | | | 705/14.23 |
| 2013/0006747 | A1* | 1/2013 | Wu | G06Q 30/0605 |
| | | | | 705/14.35 |
| 2013/0262410 | A1* | 10/2013 | Liu | G06F 16/116 |
| | | | | 707/693 |
| 2016/0117687 | A1* | 4/2016 | Nagarathinam | G06Q 50/01 |
| | | | | 705/7.29 |
| 2018/0096407 | A1* | 4/2018 | Neal | G06Q 30/0206 |

OTHER PUBLICATIONS

Providing Relevant Advertisements Based on Item-Specific Purchase History. An IP.com Prior Art Database Technical Disclosure. Authors et al.: Disclosed Anonymously. IP.com No. IPCOM000252029D. IP.com Electronic Publication Date: Dec. 14, 2017 (Year: 2017).*

S. Serth et al., "An Interactive Platform to Simulate Dynamic Pricing Competition on Online Marketplaces," 2017 IEEE 21st International Enterprise Distributed Object Computing Conference (EDOC), Quebec City, QC, Canada, 2017, pp. 61-66, doi: 10.1109/EDOC.2017.17. (Year: 2017).*

T. Wohlfarth, S. Clemencon, F. Roueff and X. Casellato, "A Data-Mining Approach to Travel Price Forecasting," 2011 10th International Conference on Machine Learning and Applications and Workshops, Honolulu, HI, USA, 2011, pp. 84-89, doi: 10.1109/ICMLA.2011.11. (Year: 2011).*

C. Marinovici, J. Hammerstrom, S. Widergren and G. Dayley, "Visualizations for real-time pricing demonstration," ISGT 2014, Washington, DC, USA, 2014, pp. 1-5, doi: 10.1109/ISGT.2014.6816428. (Year: 2014).*

* cited by examiner

US 11,790,419 B2

METHOD AND APPARATUS FOR GROUP PURCHASING USING A HISTORICAL PRICE IN AN E-COMMERCE ENVIRONMENT

CROSS-REFERENCE TO OTHER APPLICATIONS

The current application claims priority from U.S. Provisional Patent Application No. 62/674,792 filed May 22, 2018 which is hereby incorporated by reference.

FIELD

The disclosure is generally directed to the field of e-commerce and, more specifically, to a method and apparatus for group purchasing using a historical price in an e-commerce environment.

BACKGROUND

Currently, if a consumer misses a sale on a product, the consumer has to wait for the next time the product is on sale in order to purchase it at a reduced price. In some scenarios, depending on the product, this may not occur for a long period of time, such as with seasonal products like snow shovels or bathing suits. This may hurt both the merchant and the consumer as the merchant has stock of a product that is taking up storage space and the consumer cannot purchase the item because they are not interested in purchasing the product at the current price.

Therefore, there is provided a method and apparatus for group purchasing using a historical price in an e-commerce environment.

SUMMARY

In one embodiment, the disclosure allows a user to request the generation of a purchasing campaign for a product based on a historical price that the user is willing to pay. Based on the historical price, merchants may provide certain quantities of the product they are willing to sell at the historical price. If merchants agree to sell the product at the historical price, the number of available products is then determined. A purchasing campaign is generated whereby the user and other users (or consumers) can join the purchasing campaign by agreeing to purchase one or more of the products at the historical price. Once the number of signed up consumers equals or is greater than the number of available products, the purchasing campaign can be seen as finished or fulfilled. The purchases are then completed and products delivered.

In one aspect of the disclosure, there is provided a method for group purchasing using a historical price including receiving a historical price and product information for a product from a user; determining a total quantity of product available at the historical price; and generating a purchasing campaign based on the historical price and the product.

In another aspect, determining the total quantity of product available includes communicating with at least one merchant to determine a merchant quantity of product the merchant is willing to sell at the historical price; and determining the total quantity of product available by adding the merchant quantity of product from each of the at least one merchants. In a further aspect, generating the purchasing campaign includes listing the product for sale at the historical price. In yet another aspect, the method further includes monitoring the purchasing campaign; and ending the purchasing campaign when the campaign is finished based on predetermined criteria. In an aspect, the predetermined criteria includes at least one of a predetermined time frame, reaching a predetermined number of consumers, a request to end the purchasing campaign, inappropriateness or legal concerns.

In yet another aspect, the method further includes determining if the purchasing campaign has been fulfilled; and completing purchases if purchasing campaign has been fulfilled. In yet a further aspect, determining the total quantity of product available includes accessing a look-up table to determine which merchant or merchants in a set of merchants have stock of the product; determining if at least one merchant in the set of merchants has a merchant quantity of product; determining if the at least one merchant is willing to sell the all or a portion of the merchant quantity of product at the historical price; determining how much of the merchant quantity of product is available at the historical price; and calculating a total quantity of product available based on determining how much of the merchant quantity of product is available from each of the set of merchants. In another aspect, before receiving the historical price and product information for a product from a user, displaying product information and a historical prices graph. In yet another aspect, receiving the historical price includes sensing a click of the historical price in the historical prices graph.

In another aspect of the disclosure, there is provided one or more non-transitory computer-readable storage media having collectively stored therein instructions that, if executed by one or more processors of a computer system, cause the computer system to at least receive a historical price and product information for a product from a user; determine a total quantity of product available at the historical price; and generate a purchasing campaign based on the historical price and the product.

In another aspect, to determine the total quantity of product available includes communicating with at least one merchant to determine a merchant quantity of product the merchant is willing to sell at the historical price; and determining the total quantity of product available by adding the merchant quantity of product from each of the at least one merchants. In another aspect, to generate the purchasing campaign includes listing the product for sale at the historical price. In a further aspect, the instructions further cause the computer system to monitor the purchasing campaign; and end the purchasing campaign when the campaign is finished based on predetermined criteria. In an aspect, the predetermined criteria includes at least one of a predetermined time frame, reaching a predetermined number of consumers, a request to end the purchasing campaign, inappropriateness or legal concerns.

In another aspect, the instructions further cause the computer system to determine if the purchasing campaign has been fulfilled; and complete purchases if purchasing campaign has been fulfilled. In a further aspect, to determine the total quantity of product available includes accessing a look-up table to determine which merchant or merchants in a set of merchants have stock of the product; determining if at least one merchant in the set of merchants has a merchant quantity of product; determining if the at least one merchant is willing to sell the all or a portion of the merchant quantity of product at the historical price; determining how much of the merchant quantity of product is available at the historical price; and calculating a total quantity of product available based on determining how much of the merchant quantity of product is available from each of the set of merchants. In another aspect, the instructions further cause, before receiving the historical price and product information for a product from a user, the computer system to display product information and a historical prices graph. In an aspect, to receive the historical price includes sensing a click of the historical price in the historical prices graph.

DESCRIPTION OF THE DRAWINGS

Embodiments of the present disclosure will now be described, by way of example only, with reference to the attached Figures.

DETAILED DESCRIPTION OF THE EMBODIMENTS

The disclosure is directed at a method and system for group purchasing using a historical price in an e-commerce environment. In one embodiment, the method allows multiple consumers to purchase a selected product at a price that the product was previously sold at which can be seen as a historical price. By allowing a consumer to select a historical price that the consumer is willing to purchase a product, the system may initiate a purchasing campaign allowing other consumers interested in purchasing the product at the historical, or campaign, price to join a mass or group purchase. If a predetermined number of consumers join the campaign, the product may then be sold to these consumers by one or more merchants willing to accept the campaign price for the product. One advantage of the current disclosure is the purchase price of a product is buyer driven instead of being merchant driven.

Figure 3:
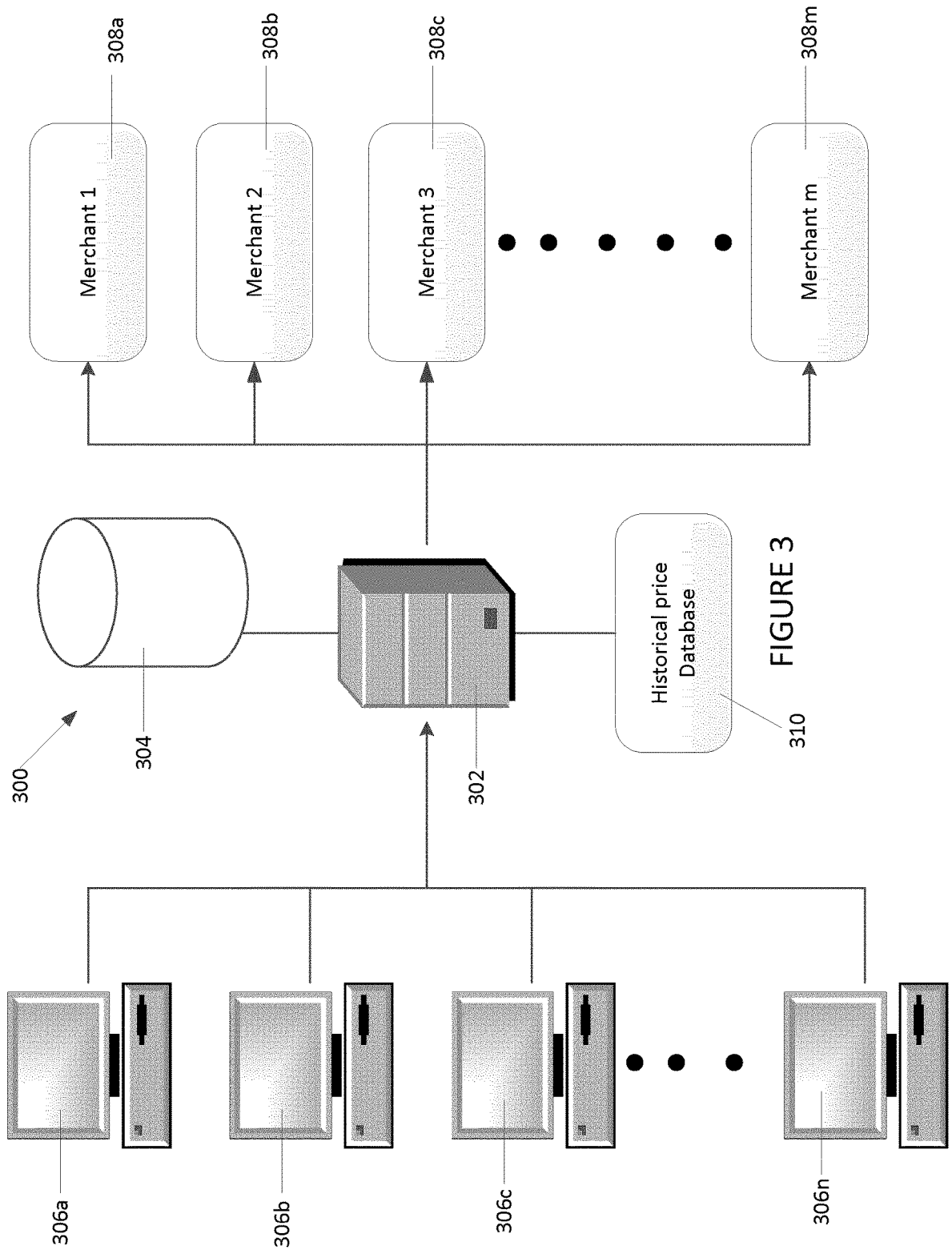
FIG. 3 is a schematic diagram of a system for mass purchasing in an e-commerce environment.

Turning to FIG. 3, a schematic diagram of a system for group purchasing using a historical price in an e-commerce environment is shown. The system 300 includes a server 302 that is in communication with a database 304 that may store various information, including but not limited to, lists of merchants, list of products associated with merchants, current or completed purchasing campaigns and user information. A list of historical prices may be stored in a historical price database 310 or may be stored in the database 304 if there is no historical price database 310.

Users or consumers (seen as user devices 306a to 306n) are operatively and communicatively connected to the server 302 in order to participate in, or request, a purchasing campaign (as will be described). User devices include, but are not limited to, desktop computers, laptops, handheld mobile devices, tablets, Smartphones and the like. It will be understood that "n" represents any number. The server 302 may also be in communication with individual merchants 308 (seen as merchant 1 to merchant m where "m" may be any number). Communication between the server 302 and a merchant 308 may be between the server 302 and a server, or computer, associated with or operated by the merchant 308.

In operation, one user (such as user device 306a) may initiate or request the initiation of a purchasing campaign by transmitting product information and a historical price for the product to the server 302. The server 302 may then perform a method of group purchasing using a historical price in an e-commerce environment, such as disclosed in either FIG. 1 or 2.

Figure 1:
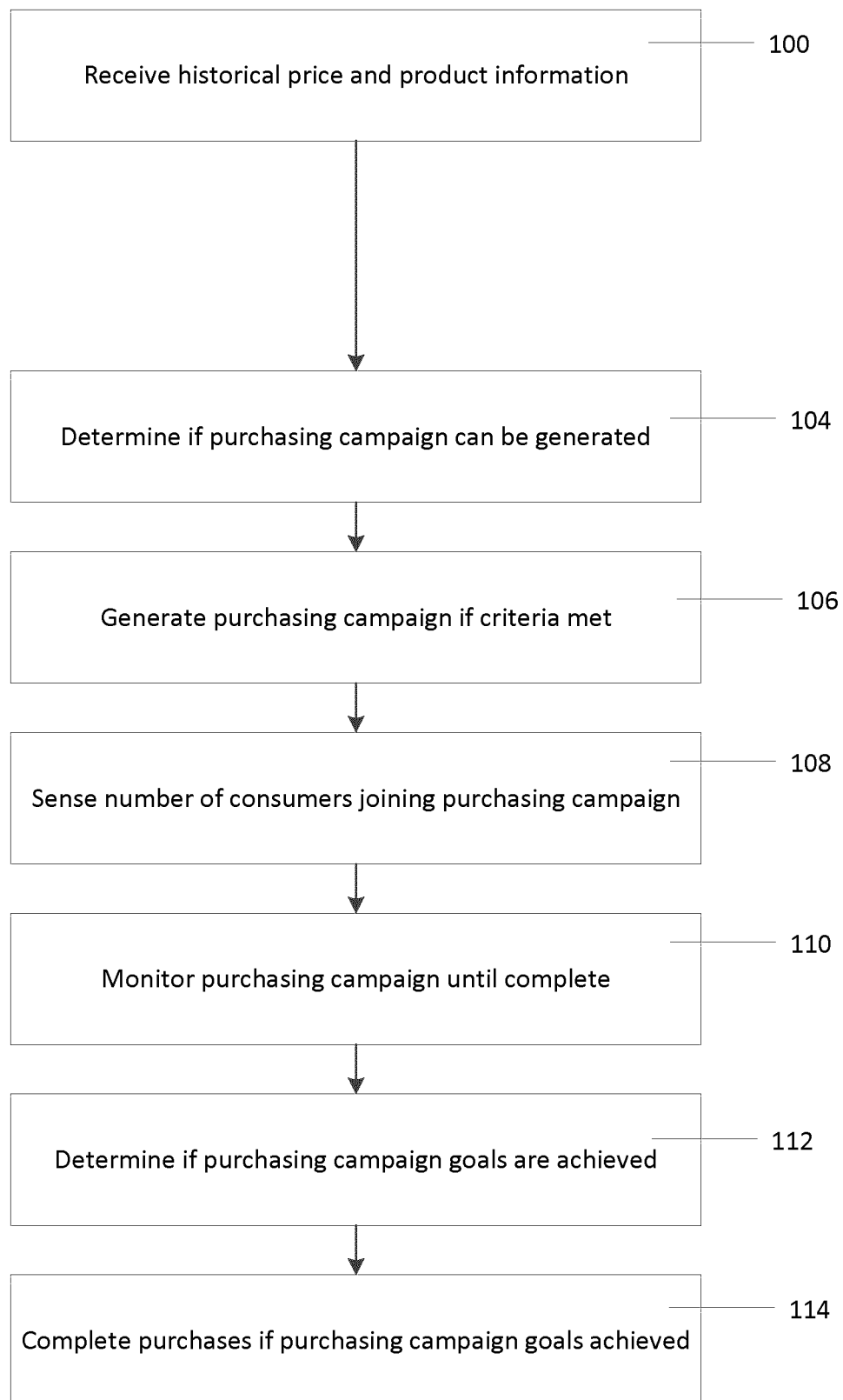
FIG. 1 is a flowchart outlining a method of mass purchasing in an e-commerce environment.

Turning to FIG. 1, a method of mass purchasing in an e-commerce environment is shown. Initially, a consumer may be searching for a product online, either in a browser or an app, to purchase and notices that the price for the product is higher than he/she is willing or wanting to pay. This does not necessarily have to be the lowest historical price. By reviewing the previous sales history, or historical prices, the consumer may find a price at which the product was previously sold that they are willing to pay. In one embodiment, the user may select the historical price from a graph of historical prices or may request a list of historical prices from the server which may retrieve such list from a database such as the historical price database.

The user may then make, or submit, an offer to purchase the product at the historical price which is sensed, or received, by the system (100). In a preferred embodiment, the system also receives product information. The historical price may also be referred to as the campaign or offer price.

The system then determines if a purchasing campaign (104) can be generated based on this information. Whether a purchasing campaign can be generated or cannot be generated may be based on whether or not merchants are willing to sell their stock of the product at the historical price. For example, the system may compare the historical price and the product information to entries in a database to determine which merchant or merchants (if any) are willing to sell the product at the historical price. Alternatively, the system may communicate with merchants to determine if a merchant is or merchants are willing to sell the product at the historical price. If there is at least one merchant interested, the system may also determine a quantity of the product the merchant is or merchants are willing to sell at the historical price.

If there is at least one merchant that is willing to sell the product at the historical price, based on the quantity of products that merchant or merchants are willing to sell, a purchasing campaign can be generated (106). A purchasing campaign can be seen as a campaign that is available to the public (such as, or similar to, a crowdfunding campaign) where a predetermined number of consumers are required to commit to purchase the product at the historical price in order to fulfill the purchasing campaign requirements. In one embodiment, the predetermined number of consumers equals the quantity of products available from the merchant or merchants. In another embodiment, the predetermined number of consumers equals a minimum quantity of product that the merchant is or merchants are willing to sell at the historical price.

After the purchasing campaign is generated, it is made public and consumers can then sign up to join the purchasing campaign. Joining the campaign means that the consumer agrees to pay the offer price for the product if the campaign is fulfilled. As such, the system may include a payment module for receiving payment information from an interested consumer or user to complete a purchase.

In order to improve the likelihood of success of the purchasing campaign, the initiating consumer (or any other consumer) may contact friends or use social media to bring attention to the purchasing campaign. This functionality may be provided by the system. The system of the disclosure may also provide an added benefit of being a social network or platform for consumers to meet and exchange information.

The system then senses the number of consumers joining or that have committed to the purchasing campaign (108) and monitors the purchasing campaign by tracking the number of consumers that have joined the purchasing campaign or committed to purchasing the product at the offer price. The system continues to monitor the purchasing campaign until the end of the purchasing campaign (110). The criteria for ending the purchasing campaign may include, but is not limited to, a predetermined time frame, reaching a goal of a predetermined number of consumers (such as equaling the quantity of products available or any other predetermined number that is acceptable to merchants), a request to end the purchasing campaign by either the consumer or the merchant or terminated based on inappropriateness or legal concerns. Alternatively, the predetermined number of consumers may be a threshold number (determined by the system or the merchant or merchants) that is less than the quantity of products available but satisfactory to the merchant or merchants. For instance, the merchant/merchants may have a quantity of 100 products available but is/are content to sell the product at the historical price as long as 75 consumers agree to pay the historical price.

After the purchasing campaign is completed (or deemed fulfilled), the system determines if the purchasing campaign goals have been achieved (112). If the purchasing campaign goals have been achieved (i.e. the requisite number of consumers have joined), the system may then complete the purchases (114). In one embodiment, completing the payment results in the system initiating payment for the products to the merchant, or merchants. It will be understood that the completion of the purchase may also be performed by the individual merchants.

One benefit of the system of the disclosure is that the consumer that makes the initial request for the purchasing campaign may then connect with others to try and promote the campaign to family or friends in order to create bigger community for making the mass purchase. Furthermore, the campaign reach consumers that may have been interested in the product but were unwilling to purchase the product at the current price.

Figure 2:
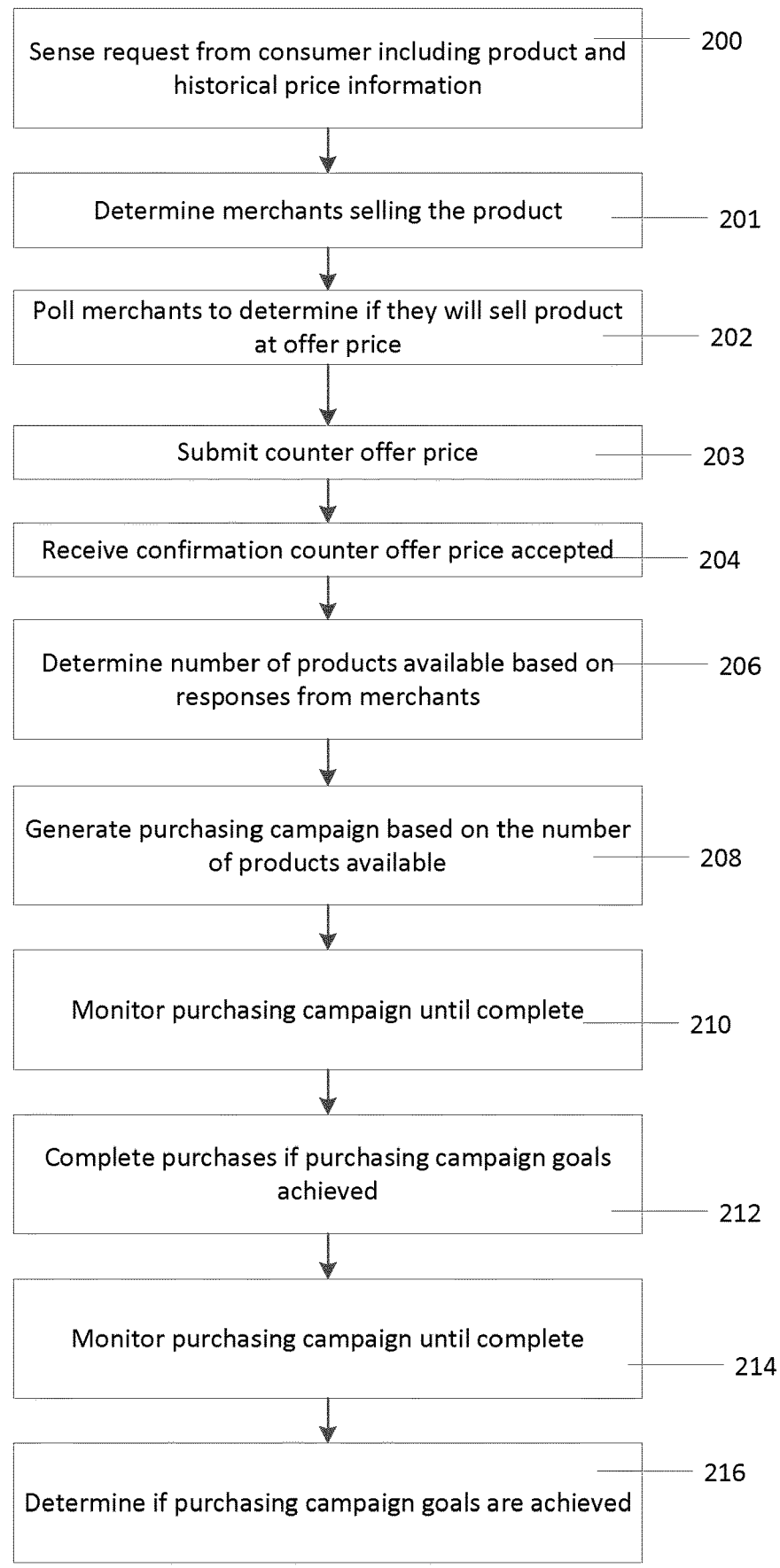
FIG. 2 is a flowchart outlining another method of mass purchasing in an e-commerce environment.

Turning to FIG. 2, another embodiment of a method for group purchasing using a historical price in an e-commerce environment is shown. Initially, the system senses a request from a consumer for a purchasing campaign (200). The request preferably includes at least an indication of a product that the consumer is interested in and the historical, or offer, price that the consumer is willing or hoping to pay. The system may then determine which merchant is or merchants are selling the product (201). This can be done by polling the merchants or by retrieving the information from a database or a look-up table.

The system can then poll or communicate with the retrieved merchant or merchants (202) to determine if they are interested in selling the product at the historical price. In some cases, the merchant or merchants may be willing to sell some or all of their stock of the product to, for instance, get rid of stock. Alternatively, the merchant or merchants may refuse to sell the product at the offer price but may respond with a counter offer price (203). If the counter offer price is not accepted, no purchasing campaign is generated. If the user accepts the counter offer price, this is received by the system (204).

The system then determines the number of items of the product that are available for the counter offer price (206) based on the responses from the merchant or merchants or the information retrieved. The system can then generate a purchasing campaign (208) based on the number of available products at the counter offer price.

The system then monitors the purchasing campaign until the end of the purchasing campaign (210) such as described above. After the purchasing campaign is completed, the system determines if the purchasing campaign goals have been achieved (212). If the purchasing campaign goals have been achieved (i.e. the requisite number of consumers have joined or based on other criteria), the system completes the purchases (214). Once a purchase is completed by the system, the system may forward the funds to the merchant and/or notify the merchant or merchants to deliver or send the purchased product to one of the consumers from the purchasing campaign.

In an alternative embodiment, the merchant or merchants may offer a coupon whereby the initiating consumer may be offered an opportunity to purchase the product at a price reduced from the current selling price. In this manner, the coupon may only be offered to the initiating consumer.

Figure 4:
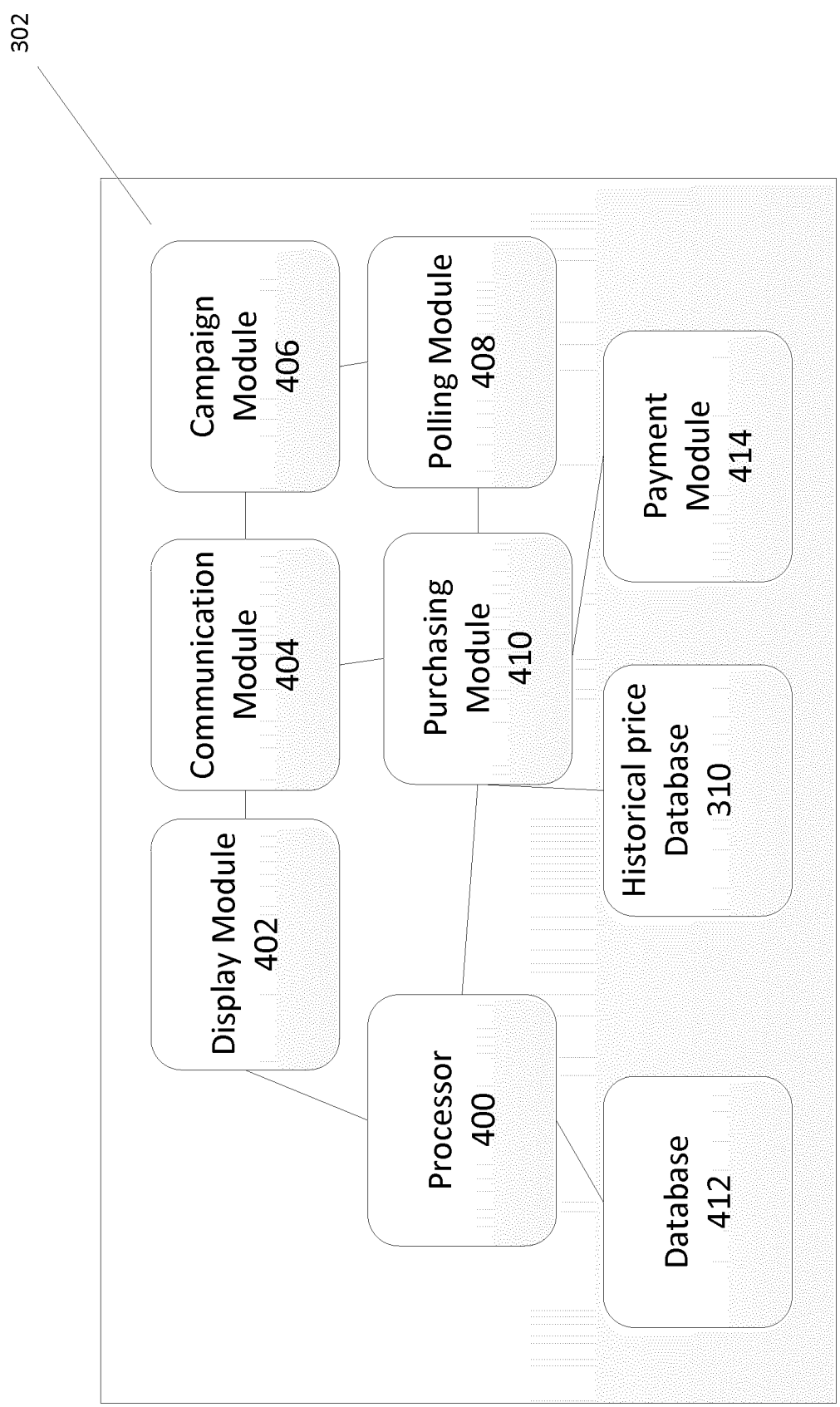
FIG. 4 is a schematic diagram of a server for use in the system of FIG. 3.

Turning to FIG. 4, a schematic diagram of a server is shown. Although the preferred embodiment is preferably implemented within a single server, it will be understood that the system may be distributed over multiple servers. The server 302 preferably includes a plurality of modules for communicating with users, consumers or and/or merchants and for generating and implementing the purchasing campaign. The server 302 may also manage the purchasing campaign as well as manage the purchasing or payment, if necessary, when the purchasing campaign is completed or fulfilled. Although connections are not shown between each component within the server, it will be understood that each of the modules may communicate with each other and with the processor and database.

As shown in FIG. 4, the server 302 includes a processor 400 that controls a plurality of modules that assist to implement the method and system of providing group purchasing using a historical price in an e-commerce environment. The plurality of modules may include, but is not limited to, a display module 402, a communication module 404, a campaign module 406, a polling module 408 and a purchasing module 410. A database 412 (or the database 304) may also be included within the server 302. The server 302 may further include the historical price database 310 and a payment module 414.

Figure 5:
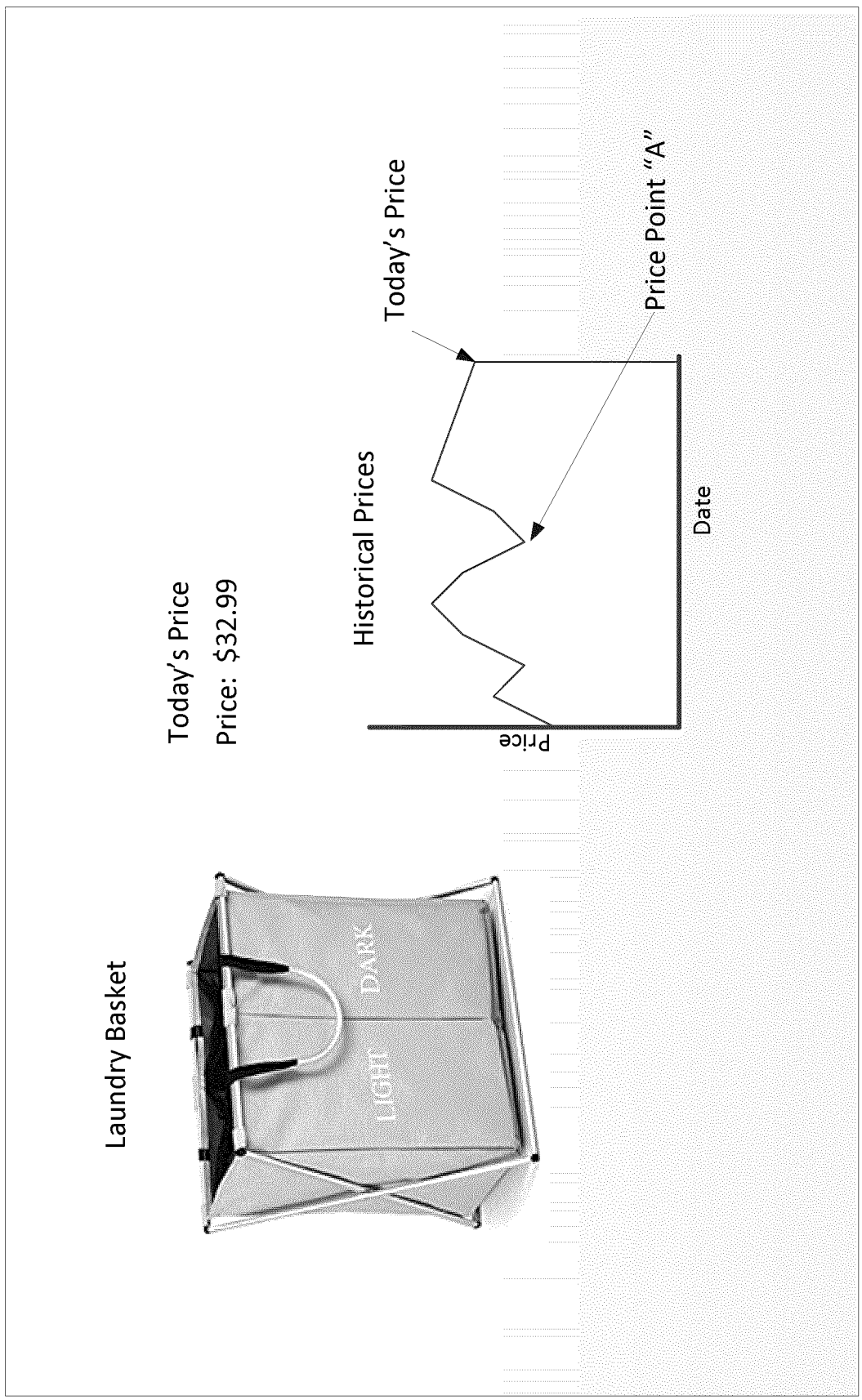
FIG. 5 is a schematic screen shot.

In one embodiment, the display module 402 operates to generate, and/or transmit images, or screens, that are displayed on the user devices 306. For instance, the display module 402 may generate screens (such as schematically shown in FIG. 5) for display to a user. The display module 402 may also perform the necessary actions to convert images from other modules into a format that is viewable on the user's particular device. The communication module 404 includes the firmware, such as apparatus, components or software, for the server 302 to communicate with the user device(s) 306 and/or merchants 308. In an alternative embodiment, the system may include one communication module to communicate with user devices and one communication module to communicate with merchants. In a preferred embodiment, the communication is performed wirelessly via any known telecommunication networks. Therefore, the components with the communication module 404 may be any components that enable wireless communication with the user device(s) 306 and/or the merchant(s).

The campaign module 406 may operate to generate and/or manage (or monitor) purchasing campaigns. The campaign module 406 may interact with a consumer (such as via the communication module) to determine the product that the user wishes to purchase along with the, historical price. The campaign module may transmit the counter offer price to the user. The campaign module 406 may then communicate with the polling module 408 to retrieve the product information from merchant or merchants (such as disclosed above) or may retrieve such information from the database 412. The campaign module 406 may also determine if, and/or when, a purchasing campaign is fulfilled or completed. The campaign module may also maintain a list of consumers that have signed up for or committed to the purchasing campaign.

In one embodiment, the communication module 404 transmits the product information and historical price that was received from the requesting consumer to the campaign module 406 which then performs the actions required to determine if a purchasing campaign should be generated.

In one embodiment, the polling module 408 retrieves product information from databases or servers relating to a merchant or merchants to determine if they are willing to sell the requested product at the historical price and the quantity of product they are willing to sell. The polling module 408 may also perform this by directly communicating with each merchant.

The purchasing module (which may or may not be part of the system) 410 may operate to complete transactions if the purchasing campaign is fulfilled. The payment module may also assist in the completion of transactions.

Turning to FIG. 5, a schematic screenshot of the disclosure is shown. In the screenshot, which is directed at a laundry basket, it can be seen that the current, or Today's, price for the product is $32.99. From the Historical Prices graph, it can be seen that the price of the laundry basket has been lower than Today's Price at one point in time. As the user does not want to purchase the laundry basket at Today's Price, the user may select a historical price within the Historical Prices graph at which the user is willing to pay, such as, Price Point "A".

By selecting the Price Point "A", the system receives this historical price and then polls the merchants that have stock of the Laundry Basket to see if they are willing to sell the Laundry Basket at the historical price, and how many Laundry Baskets they are willing to sell at the offer price.

After determining the number of Laundry Baskets available from the merchants (seen as the purchasing campaign goal), the system of the disclosure then generates a purchasing campaign for individuals who may be interested in purchasing the Laundry Basket at the offer price. Once the number of interested individuals equals the purchasing campaign goal, the purchasing campaign can be seen as being fulfilled and the purchases confirmed and completed.

One advantage of the current disclosure is that it allows a user or consumer to select a historical price (at which a product was previously sold) and to have an opportunity to buy it at that historical price. In this manner, the price of a product on sale is consumer driven rather than merchant driven. Another advantage of the system is that it may allow merchants who have stock in the product to sell their excess product at that previous price (if they desire) to reduce stock and release storage space. This may be beneficial with respect to seasonal goods that may be sold during a specific time frame of the year but takes up valuable storage area during the rest of the year.

Another advantage of the disclosure is that merchants can combine their inventory to help each other reduce the storage space necessary to store overstock. Another advantage of the disclosure is that the purchasing campaign provides a more social platform for users and consumers to interact and to work together to benefit from similar desires for a product. Users may invite other friends to join the campaign so that there is teamwork to meet the necessary number of users to complete the purchasing campaign. Merchants benefit from selling products at a price they are comfortable with.

In another embodiment, the completion of the purchase may be implemented via a coupon being transmitted to a user (or individual in the campaign) such that the user can then take the coupon to a merchant to purchase the product in store. This may be beneficial when the product is large or may not be suitable for delivery.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure.

In the preceding description, for purposes of explanation, numerous details are set forth in order to provide a thorough understanding of the embodiments. However, it will be apparent to one skilled in the art that these specific details may not be required. In other instances, well-known structures may be shown in block diagram form in order not to obscure the understanding. For example, specific details are not provided as to whether elements of the embodiments described herein are implemented as a software routine, hardware circuit, firmware, or a combination thereof.

Embodiments of the disclosure or components thereof can be provided as or represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor or controller to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor, controller or other suitable processing device, and can interface with circuitry to perform the described tasks.

What is claimed is:

1. A method for group purchasing using a historical price comprising:
   generating instructions from a server operably coupled to a communication network to send to a user device to display product information including an image of a product and current price along with simultaneous display of a historical prices graph that presents a display of price over time for the product;
   receiving, at the server, an indication of a desire to purchase the product at the historical price from a user via selection, by the user at a user device operably coupled to the communication network, selecting a price point by clicking on the historical prices graph of the historical price;

determining, at the server, a total quantity of the product available at the historical price by communicating with multiple merchants, via the communication network, to:
provide each of the merchants with the product information and the historical price,
receive from the each of the merchants a response via the communication network indicating a merchant quantity of the product that a respective one of the each of the merchants is willing to sell at the historical price, and
add the merchant quantity of the product received from the each of the merchants to determine the total quantity; and
generating a purchasing campaign based on the historical price and the product by generating images viewable at a plurality of user devices indicating the product information and the historical price to the plurality of user devices,
wherein the server is further configured to employ a display module to convert the images into a format viewable on each of the plurality of user devices.

2. The method of claim 1 wherein generating the purchasing campaign comprises: listing the product for sale at the historical price.

3. The method of claim 2 further comprising:
monitoring the purchasing campaign; and
ending the purchasing campaign when the campaign is finished based on predetermined criteria.

4. The method of claim 3 wherein the predetermined criteria comprises at least one of: a predetermined time frame, reaching a predetermined number of consumers, a request to end the purchasing campaign, inappropriateness or legal concerns.

5. The method of claim 4 further comprising:
determining if the purchasing campaign has been fulfilled; and
completing purchases if purchasing campaign has been fulfilled.

6. The method of claim 1 wherein determining the total quantity of product available comprises:
accessing, at the server, a look-up table to determine which merchant or merchants in a set of merchants have stock of the product;
determining, at the server, if at least one merchant in the set of merchants has a quantity of the product in stock;
determining, via an exchange of messages communicated between the server and the at least one merchant via the communication network, if the at least one merchant is willing to sell the all or a portion of the quantity of product at the historical price; and
determining, at the server, the merchant quantity for the at least one merchant as how much of the quantity of product the at least one merchant is willing to sell at the historical price.

7. The method of claim 1, further comprising:
receiving, at the server via the communication network, a counter offer price from at least one merchant;
communicating, by the server to the user device via the communication network, the counter offer price; and
responsive to acceptance of the counter offer price by the user, substituting the counter offer price for the historical price and generating the purchase campaign based on the counter offer price.

8. The method of claim 1, wherein the communication network is a wireless communication network.

9. One or more non-transitory computer-readable storage media of a server having collectively stored therein instructions that, if executed by one or more processors of a computer system, cause the computer system to at least:
generate instructions from a server operably coupled to a communication network to send to a user device to display product information including an image of a product and current price along with simultaneous display of a historical prices graph that presents a display of price over time for the product;
receive, at the server, an indication of a desire to purchase the product at the historical price from a user via selection, by the user at a user device operably coupled to the communication network, selecting a price point by clicking on the historical prices graph of the historical price;
determine, at the server, a total quantity of the product available at the historical price by communicating with multiple merchants, via the communication network, to:
provide each of the merchants with the product information and the historical price,
receive from the each of the merchants a response via the communication network indicating a merchant quantity of the product that a respective one of the each of the merchants is willing to sell at the historical price, and
add the merchant quantity of the product received from the each of the merchants to determine the total quantity; and
generate a purchasing campaign based on the historical price and the product by generating images viewable at a plurality of user devices indicating the product information and the historical price to the plurality of user devices,
wherein the server is further configured to employ a display module to convert the images into a format viewable on each of the plurality of user devices.

10. The one or more non-transitory computer-readable storage media of claim 9 wherein to generate the purchasing campaign comprises: listing the product for sale at the historical price.

11. The one or more non-transitory computer-readable storage media of claim 10 wherein the instructions, if executed, further cause the computer system to:
monitor the purchasing campaign; and
end the purchasing campaign when the campaign is finished based on predetermined criteria.

12. The one or more non-transitory computer-readable storage media of claim 11 wherein the predetermined criteria comprises at least one of: a predetermined time frame, reaching a predetermined number of consumers, a request to end the purchasing campaign, inappropriateness or legal concerns.

13. The one or more non-transitory computer-readable storage media of claim 12 wherein the instructions, if executed, further cause the computer system to:
determine if the purchasing campaign has been fulfilled; and
complete purchases if purchasing campaign has been fulfilled.

14. The one or more non-transitory computer-readable storage media of claim 9 wherein to determine the total quantity of product available comprises:
accessing, at the server, a look-up table to determine which merchant or merchants in a set of merchants have stock of the product;

determining, at the server, if at least one merchant in the set of merchants has a quantity of the product in stock;

determining, via an exchange of messages communicated between the server and the at least one merchant via the communication network, if the at least one merchant is willing to sell the all or a portion of the quantity of product at the historical price; and determining, at the server, the merchant quantity for the at least one merchant as how much of the quantity of product the at least one merchant is willing to sell at the historical price.

15. The one or more non-transitory computer-readable storage media of claim 9, wherein the instructions, if executed, further cause:

receiving, at the server via the communication network, a counter offer price from at least one merchant;

communicating, by the server to the user device via the communication network, the counter offer price; and responsive to acceptance of the counter offer price by the user, substituting the counter offer price for the historical price and generating the purchase campaign based on the counter offer price.

16. The one or more non-transitory computer-readable storage media of claim 15, wherein the communication network is a wireless communication network.

\* \* \* \* \*